Sept. 9, 1969     M. SCHOTTANES     3,465,905
MULTIPLE VACUUM BOTTLE CONTAINER
Filed June 22, 1967     2 Sheets-Sheet 2
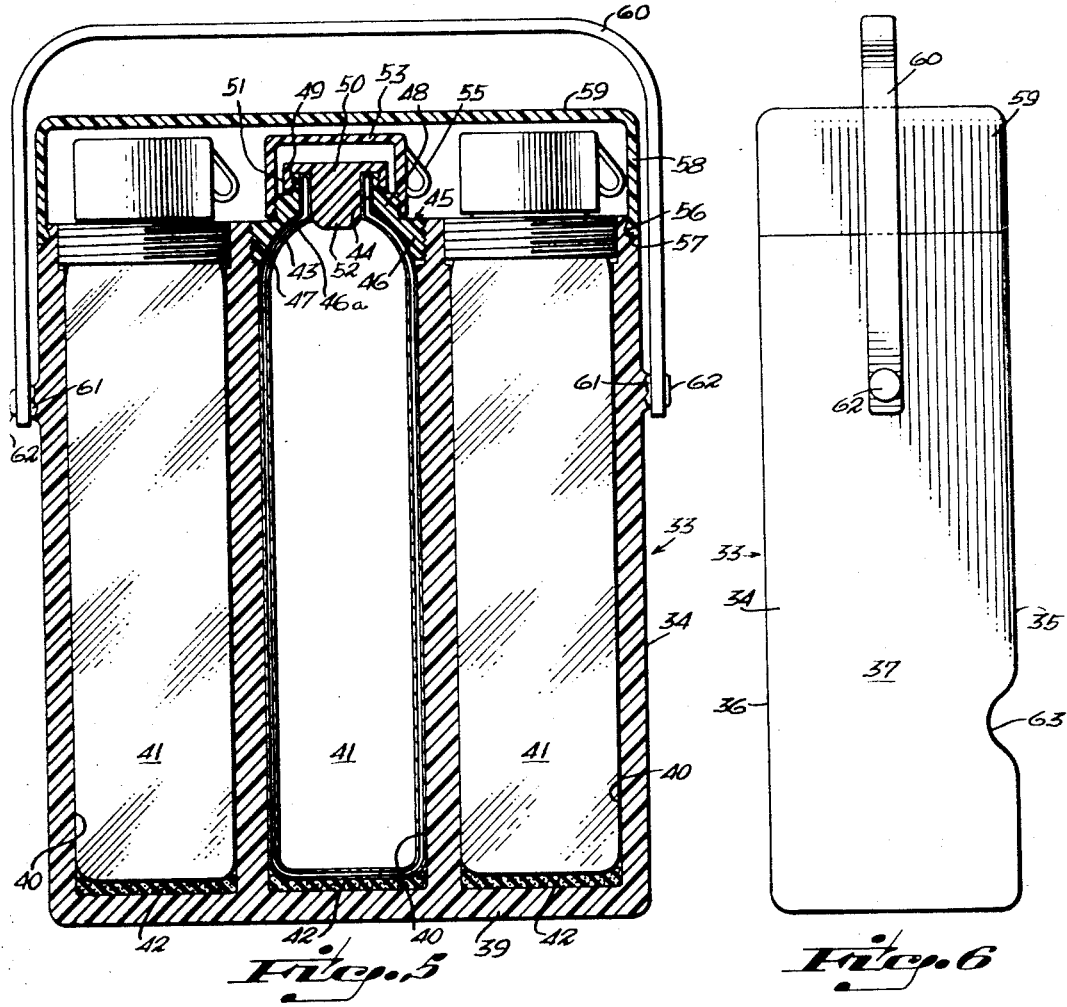
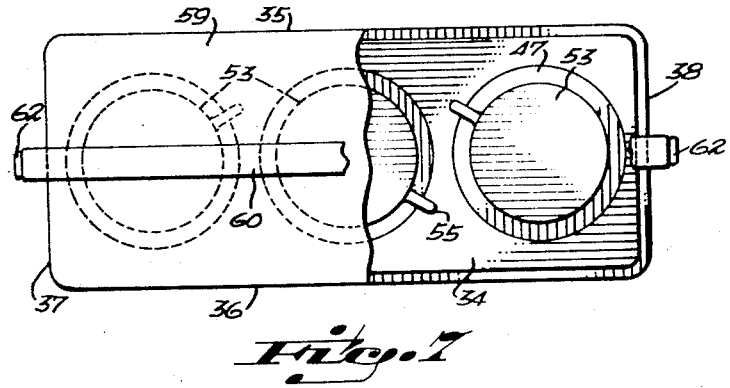
INVENTOR.
MARTIN SCHOTTANES
BY James J. Cannon
ATTORNEY.

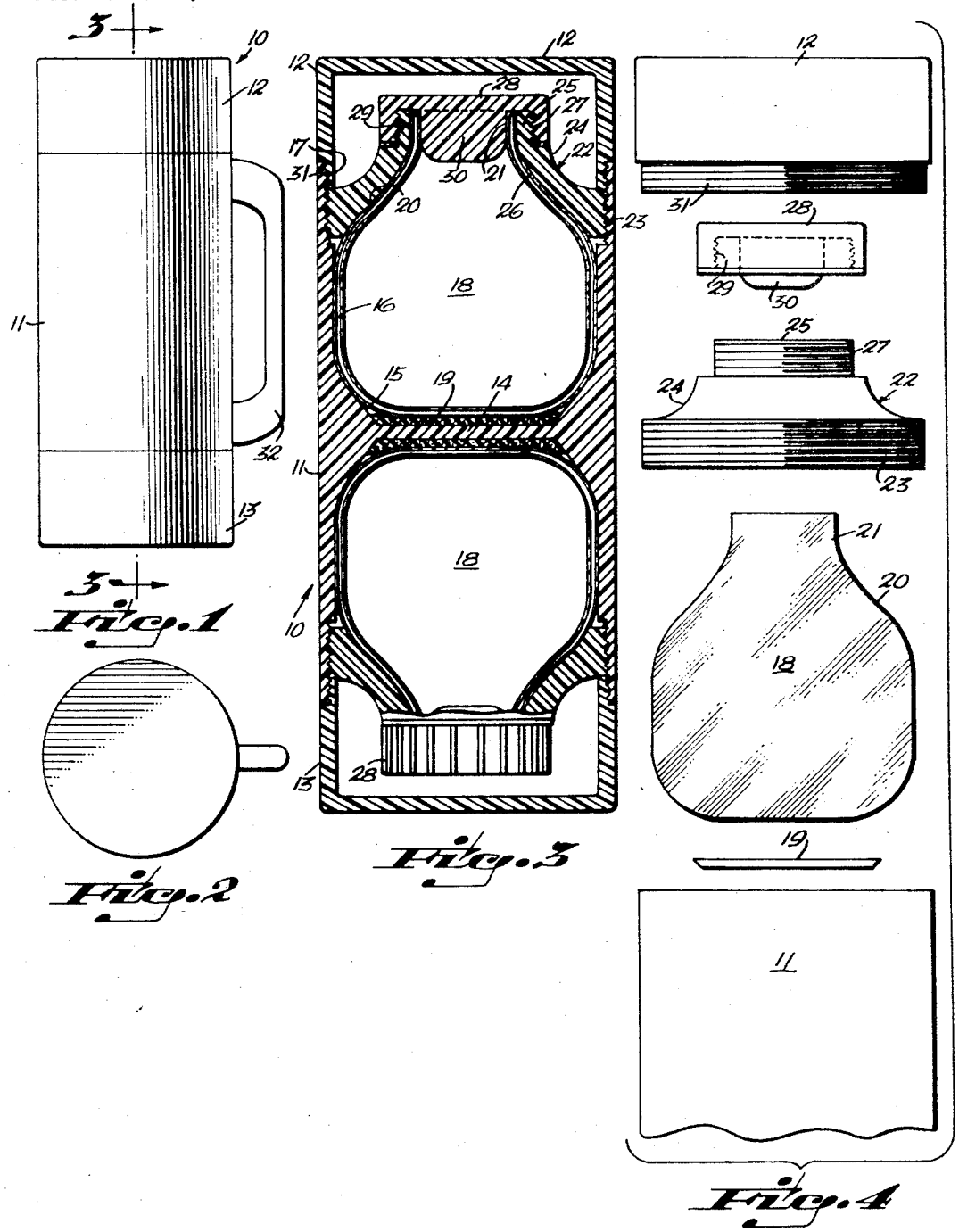

United States Patent Office 3,465,905
Patented Sept. 9, 1969

3,465,905
MULTIPLE VACUUM BOTTLE CONTAINER
Martin Schottanes, 172 Linda Vista Ave.,
North Haledon, N.J.
Filed June 22, 1967, Ser. No. 647,971
Int. Cl. B65d 1/04, 11/16
U.S. Cl. 215—6                2 Claims

ABSTRACT OF THE DISCLOSURE

A multiple vacuum bottle container construction including a body member integrally molded of a synthetic plastic and provided with a plurality of deep recesses received within which are vacuum bottles or jars having reduced diameter necks including collar members threadable with the outer ends of the body member recesses and adapted to retain the vacuum bottles in place, the collars having threaded outer end portions for receiving stopper caps arranged and adapted to seal off the contents of an associated vacuum bottle.

---

This invention relates to vacuum or "Thermos" bottles and is directed particularly to improvements in containers including two or more vacuum bottles, flasks or jars for carrying a like plurality of beverages or drinks and semi-solid foods or a combination thereof, as may be desired.

The use of vacuum or so-called "Thermos" bottles for keeping beverages and foods hot or cold for consumption on outings and picnics, or for lunch when away from the home and on the job, for example, is well known. Such vacuum bottles as have heretofore been devised, however, have been bulky and heavy with relation to the amount of food or beverage contained. It is, accordingly, the principal object of my invention to provide an improved vacuum bottle container construction wherein the over-all size of the container, as compared with food or beverage capacity, is kept to a minimum.

Another object of my invention is to provide an improved vacuum bottle container construction that is well suited to multiple bottle or jar use, and wherein the beverage or food in one of the vacuum bottles can readily be removed without disturbing the contents of the other vacuum bottles.

A more particular object is to provide a multiple vacuum bottle container of the character described which, for the most part, can readily be molded of a synthetic plastic material, thereby permitting inexpensive construction.

Yet another object is to provide a multiple vacuum bottle assemblage of the character described which will be simple in construction, attractive in appearance, which includes cups or the like for use in consuming the contained foods or beverages, which will be unusually compact and light in weight, and which will be durable in use.

Other objects, features and advantages of the invention will be apparent from the following description when read with reference to the accompanying drawings.

In the drawings, wherein like reference numerals denote corresponding parts throughout the several views:

FIG. 1 is a side elevational view of a two vacuum bottle container construction embodying the invention;

FIG. 2 is an end view of the vacuum bottle container shown in FIG. 1;

FIG. 3 is a vertical cross-sectional view of the vacuum bottle construction illustrated in FIGS. 1 and 2, shown in an enlarged scale;

FIG. 4 is an "exploded" view of the vacuum bottle assemblage illustrated in FIGS. 1, 2 and 3;

FIG. 5 is a modified form of the invention having three vacuum bottles assembled in a common container, shown in vertical cross-section;

FIG. 6 is a side elevational view of the container illustrated in FIG. 5; and

FIG. 7 is a top view thereof, with portions broken away to illustrate details of interior construction.

Referring now in detail to the drawings and considering first the embodiment of the invention illustrated in FIGS. 1 through 4, the same comprises two vacuum or "Thermos" bottle container assemblage 10 comprising, generally, a cylindrical body member 11 fitted with opposed, identical end caps 12, 13, which, as is hereinafter described, serve as individual food or drink cups or receptacles. The cylindrical body member 11 is integrally fabricated, as by molding, of a tough, synthetic plastic material having good heat insulation properties, and is formed with a central, transverse partition 14, the outer peripheral edge of which merges at each side with an outwardly-inclined, annular wall portion 15, extending into opposed, outwardly-extending tubular wall or skirt portions 16. The outer ends of the opposed skirt portions 16 are internally threaded as indicated in 17. The partition 14, together with the side wall portions 15 and tubular wall portions 16 of the cylindrical body member 11 define opposed openings or recesses received within which are vacuum bodies 18 of such outer shape and configuration as to fit snugly therein, as illustrated in FIG. 3. The vacuum bottles 18 seat against circular, resilient pads 19, which may be of foam rubber for example, against which they are firmly secured in place within the cylindrical body member 11 by means hereinafter described.

As illustrated in FIGS. 3 and 4, the vacuum or "Thermos" bottles 18 are of the usual double glass wall construction evacuated and silvered for insulation against cold and heat, and are formed at their open ends with an inwardly-curved shoulder portion 20 merging into a short, upwardly-extending neck portion 21. Collars 22, which preferably are also molded of a strong synthetic plastic material are employed to hold the vacuum bottles or flasks 18 securely in place. To this end, each collar 22 is formed with an externally-threaded flange portion 23, threadingly received within the internally-threaded portion 17 at the outer ends of the cylindrical body member tubular walls 16. The collars 22 are further integrally formed with inwardly-curved body portions 24 terminating in reduced-diameter neck portions 25. As illustrated in FIG. 3, the inner shape of the body portion 24 of the collars 22 is such as to conform to the shape of the shoulder and neck portions 20, 21 respectively of the vacuum bottles 18, both being symmetrical about a longitudinal axis of rotation to permit screwing down of the collars 22 to secure their respective vacuum bottles 18 in firmly clamped engagement against their resilient seat pads 19.

As illustrated in FIGS. 3 and 4, the reduced diameter neck portion 25 of each collar 22 is externally threaded, as indicated at 27, to receive, removably threaded thereupon, a stopper cap 28 having an internally-threaded skirt portion 29. The stopper caps 28, which are preferably formed of a somewhat resilient plastic material, are integrally formed with a central plug portion 30, extending axially in the same direction as the skirt portion 29 and of such diameter as to sealingly plug the mouth opening at the neck of the vacuum or Thermos flasks or bottles 18.

The cylindrical end caps 12, 13 are integrally molded in the shape of cylindrical cups, and are of such outer diameter and so externally threaded at their outer ends, as indicated at 31, as to be removably screwed in place with respect to the internal threads 17 at the outer end of the cylindrical body 11 in covering relationship with respect to the stoppers 28. As illustrated in FIGS. 1 and 2, the cylindrical body member 11 is further formed with an outwardly-projecting, longitudinally-symmetrical handle 32, by means of which the vacuum or "Thermos" container 10 can conveniently be picked up by one hand for pouring from a vacuum bottle 18 at either end.

Referring now to FIGS. 5, 6 and 7, illustrating a modified form of the invention indicated by reference numeral 33, the same comprises a generally rectangular container member 34, having front and back outer wall surfaces 35, 36, respectively, side walls 37 and 38, and a bottom wall 39. As illustrated in FIGS. 5 and 7, the container member 34 is preferably integrally molded of a tough, synthetic plastic material, and formed with a plurality, three in the embodiment illustrated, of deep, cylindrical recesses 40 in equidistantly spaced, side-to-side alignment and extending from the top nearly to the bottom therein. As illustrated in FIG. 5, a cylindrical vacuum or "Thermos" bottle 41 is received within each of the cylindrical openings 40 in seating engagement with circular, resilient pads 42 at the inner ends of said cylindrical openings. The upper ends of the vacuum bottles 41 are inwardly rounded to form arcuate shoulder portions 43 which merge at their outer ends with short, axially outwardly-extending, cylindrical neck portions 44.

As illustrated in FIG. 5, collars 45 are used to secure the vacuum or "Thermos" bottles 41 in place within their respective cylindrical openings 40, said collars each being formed with an externally-threaded, annular flange portion 46, threadingly engaged with internal threads 47 formed at the outer ends of the cylindrical openings 40, and an inwardly-curved body portion 46a defining an interior shape conforming to the shoulder and neck portions 43, 44 of their associated "Thermos" bottles 41. The body portions 46a of each collar 45 extends axially into a first externally-threaded reduced-diameter portion 48 and, outwardly thereof, a second externally-threaded, reduced-diameter portion 49. A stopper cap 50 is removably screwed upon the second externally-threaded reduced-diameter portion 49 of the collar 45, said stopper cap member being formed with an internally-threaded circular skirt portion 51 for this purpose. The stopper member 50 is also integrally formed with a central, somewhat resilient plug portion 52, operative to be received within the neck opening of its associated "Thermos" bottle 41 when said stopper cap member is secured in place, as illustrated in FIG. 5.

Threadingly received over the stopper cap members 50 are cylindrical cups 53, said cups being internally threaded at their outer ends for threading engagement with the first externally-threaded reduced-diameter portion 48 of the collar 45. Cup members 53 are preferably formed with handles 55.

As illustrated in FIG. 5, the container member 34 is integrally formed about the upper or outer periphery thereof, with an arcuate recess 56 for the reception of a complemental bead 57 formed within the outer end of the peripheral skirt 58 of a cover 59 deep enough to enclose the cups 53. It will be understood that the cover 59 will be of such size and shape, and of such resiliency as will readily permit its assembly and removal with respect to the container member 34 with snap on and off action. A U-shaped handle 60 extends over the top of the cover 59 in straddling relation with respect to the side walls 37, 38 thereof and in pivotal connection, at its outer ends, with opposed bosses 61, 61 formed in said side walls, such as by being snapped over increased-diameter head portions 62, 62 at the outer ends of said bosses. A horizontally-extending notch or recess 63 formed in the outer wall 35 near the lower end thereof facilitates pouring from one or another of the vacuum bottles 41 in cooperative use with the handle 60.

What I claim as new and desire to secure by Letters Patent is:

1. A multiple vacuum bottle container comprising, a body member formed with a plurality of deep recesses, cylindrical vacuum bottles having reduced diameter necks disposed, one each, in said recesses with their necks directed outwardly, collar members surrounding said vacuum bottle necks in embracing relationship for holding said vacuum bottles in place, means for removably securing said collar members in place with respect to said body member, a stopper cap for each of said vacuum bottles, and means for removably attaching said stopper caps to the outer ends of their respective collar members in covering relation with respect to the associated vacuum bottle neck opening, said stopper caps each being formed with a central plug portion operative to fit into the neck of and seal off the associated vacuum bottle opening when attached to its respective collar member wherein said collar members each includes an intermediate, reduced-diameter, externally-threaded portion, and including cylindrical cup members threadingly received, one each, thereon.

2. A multiple vacuum bottle container as defined in claim 1 including a cover member removably received over said one end of said body member in spaced covering relation with respect to said cup members.

References Cited

UNITED STATES PATENTS

| | | | |
|---|---|---|---|
| 2,833,436 | 5/1958 | Ruderian | 206—4 X |
| 3,327,881 | 6/1967 | Maier | 215—6 |
| 2,644,578 | 7/1953 | Bramming | 206—4 X |
| 545,007 | 8/1895 | Bertele | 206—4 |

FOREIGN PATENTS

| | | |
|---|---|---|
| 734,012 | 7/1932 | France. |
| 1,076,060 | 4/1954 | France. |

JOSEPH R. LECLAIR, Primary Examiner

JOHN M. CASKIE, Assistant Examiner

U.S. Cl. X.R.

206—4